US012604390B2

(12) United States Patent
Buske et al.

(10) Patent No.: US 12,604,390 B2
(45) Date of Patent: Apr. 14, 2026

(54) METHOD, APPARATUS AND USE OF AN APPARATUS FOR PRODUCING A PLASMA-ACTIVATED LIQUID

(71) Applicant: Christian Buske, Bielefeld (DE)

(72) Inventors: Christian Buske, Bielefeld (DE); Katharina Richter, Hallet Cove (AU)

(73) Assignee: Christian Buske, Bielefeld (DE)

( * ) Notice: Subject to any disclaimer, the term of this patent is extended or adjusted under 35 U.S.C. 154(b) by 0 days.

(21) Appl. No.: 18/993,803

(22) PCT Filed: Jul. 10, 2023

(86) PCT No.: PCT/EP2023/069001
§ 371 (c)(1),
(2) Date: Jan. 13, 2025

(87) PCT Pub. No.: WO2024/013069
PCT Pub. Date: Jan. 18, 2024

(65) Prior Publication Data

US 2026/0006711 A1 Jan. 1, 2026

(30) Foreign Application Priority Data

Jul. 14, 2022 (DE) ..................... 10 2022 117 651.7

(51) Int. Cl.
*H05H 1/42* (2006.01)
*H05H 1/24* (2006.01)
*H05H 1/48* (2006.01)

(52) U.S. Cl.
CPC ............ *H05H 1/42* (2013.01); *H05H 1/2406* (2013.01); *H05H 1/48* (2013.01)

(58) Field of Classification Search
CPC ........... H05H 1/42; H05H 1/2406; H05H 1/48
See application file for complete search history.

(56) References Cited

U.S. PATENT DOCUMENTS 4,909,914 A 3/1990 Chiba et al.
10,669,169 B2 * 6/2020 Pemen .................... C02F 1/722
(Continued)

FOREIGN PATENT DOCUMENTS

DE 102020119222 A1 1/2022
EP 3346808 A1 7/2018
(Continued)

OTHER PUBLICATIONS

Sivachandiran L. et al. "Enhanced seed germination and plant growth by atmospheric pressure cold air plasma: combined effect of seed and water treatment", RSC Advances, Jan. 2017, pp. 1822-1832, vol. 7, No. 4.

*Primary Examiner* — Renan Luque
(74) *Attorney, Agent, or Firm* — The Webb Law Firm

(57) ABSTRACT

The present invention provides a process for producing a plasma-activated liquid. A first plasma source is supplied with a first working gas and the first plasma source is used to generate a plasma in the first working gas so that the first plasma source provides a first reactive gas stream. A further plasma source is supplied with a further working gas and the further plasma source is used to generate a plasma in the further working gas so that the further plasma source provides a further reactive gas stream. A plasma-activated liquid is produced using the first and the further reactive gas stream. The composition of the first working gas differs from the composition of the further working gas. An appropriately configured apparatus and a use of such an apparatus for producing a plasma-activated liquid are likewise described.

8 Claims, 6 Drawing Sheets

(56) References Cited

U.S. PATENT DOCUMENTS

| | | | | |
|---|---|---|---|---|
| 2019/0313582 | A1* | 10/2019 | Hummel | A61L 2/0088 |
| 2023/0116658 | A1* | 4/2023 | Wu | H05H 1/245<br>315/111.21 |

FOREIGN PATENT DOCUMENTS

| | | | |
|---|---|---|---|
| EP | 3470364 | A1 | 4/2019 |
| KR | 101057453 | B1 | 8/2011 |
| KR | 1020140101114 | A | 8/2014 |
| WO | 2022099109 | A1 | 5/2022 |

* cited by examiner

METHOD, APPARATUS AND USE OF AN APPARATUS FOR PRODUCING A PLASMA-ACTIVATED LIQUID

CROSS-REFERENCE TO RELATED APPLICATIONS

This application is the United States national phase of International Patent Application No. PCT/EP2023/069001 filed Jul. 10, 2023, and claims priority to German Patent Application No. 10 2022 117 651.7 filed Jul. 14, 2022, the disclosures of which are hereby incorporated by reference in their entireties.

BACKGROUND OF THE INVENTION

Field of the Invention

The invention relates to a method and an apparatus for producing a plasma-activated liquid, and to the use of such an apparatus.

Description of Related Art

It is known from the state of the art to introduce a working gas, for example air, into a plasma source to generate a plasma-activated liquid and to introduce the reactive gas resulting from the reaction of the working gas with the plasma into a starting liquid. Plasma sources that generate a plasma in the working gas by means of a dielectrically impeded discharge or an arc-like discharge are usually used for this purpose.

This procedure has the disadvantage that the composition of the reactive gas stream, in particular the composition of the reactive species in it, cannot be easily controlled. In particular, undesired, uncontrolled reactions can occur in the gas mixture that is exposed to the plasma.

These reactions occur in part due to the high temperatures of the gas mixture in the plasma that prevail, for example, when using an arc discharge, such as an arc discharge generated by means of a pulsed alternating current (for example, in the order of several $10^3$ K, in particular in the range of 6000 to 8000 K). Thus, relatively large quantities of split nitrogen molecules can be found in an air stream that has been activated by generating a plasma jet by means of an arc-type discharge. In a plasma generated in air by a dielectrically impeded discharge, lower temperatures are reached, and correspondingly fewer excited particles are available to split nitrogen. Nevertheless, nitrogen oxide is produced by plasma activation of air, albeit in lower concentrations than with an arc-type discharge.

In addition, the formation of undesired species or the degradation of desired species, for example through reaction with undesired species, can occur in the plasma-activated working gas. Overall, it is difficult or impossible to produce a plasma-activated liquid with a desired composition using the known methods.

A method for providing a plasma-activated liquid is known, for example, from publication EP 3 346 808 A1, in which two gas products are mixed in a mixing chamber. In addition, the publication DE 10 2020 119222 A1 discloses two plasma sources for the parallel generation of reactive gas streams, which are first mixed and only then used to pressurize a liquid.

SUMMARY OF THE INVENTION

The present invention is based on the task of improving previously known methods and apparatuses.

This problem is solved by a method for producing a plasma-activated liquid, wherein a first working gas is supplied to a first plasma source and a plasma is generated in the first working gas by the first plasma source, so that the first plasma source provides a first reactive gas stream, wherein a further working gas is supplied to a further plasma source and a plasma is generated in the further working gas with the further plasma source, so that the further plasma source provides a further reactive gas stream, and wherein a plasma-activated liquid is produced using the first and further reactive gas streams, wherein the composition of the first working gas differs from the composition of the further working gas, wherein the plasma-activated liquid is produced by impinging a first starting liquid (182) with the first reactive gas stream to provide a first impinged liquid, impinging a second starting liquid with the second reactive gas stream to provide a further impinged liquid, and obtaining the plasma-activated liquid by mixing the first impinged liquid with the further impinged liquid.

The above task is further solved according to the invention by an apparatus for producing a plasma-activated liquid, with a first plasma source and with a second plasma source, wherein a first activation chamber with a first liquid and a second activation chamber with a second liquid are provided, wherein each activation chamber comprises an impinging device, wherein the first plasma source is fluidically connected to the first activation chamber or to the impinging device of the first activation chamber, wherein the second plasma source is fluidically connected to the second activation chamber or to the impinging device of the second activation chamber, wherein the first plasma source and the second plasma source are configured to generate a reactive gas stream by means of an arc-like discharge in a working gas, characterized in that the device is designed in such a way that the first plasma source is supplied with a first working gas and the second plasma source is supplied with a second working gas in parallel, that the first plasma source generates a plasma in the first working gas and the resulting first reactive gas stream flows from the first plasma source to the impinging device and is thus mixed with the liquid in the first activation chamber, and that, in parallel and simultaneously, the second plasma source generates a second reactive gas stream by discharge in the second working gas, the second reactive gas stream being fed to the second activation chamber of the impinging device and supplied to the liquid present in the second activation chamber, so that a first liquid impinged with the first reactive gas stream is provided in the first activation chamber and, in parallel, a second liquid impinged with the second reactive gas stream is provided in the second activation chamber, and in that the device has a mixing container which is fluidically connected to the first activation chamber and to the second activation chamber, so that the first impinged liquid and the second impinged liquid are fed to the mixing container and mixed therein to form a plasma-activated liquid.

Also disclosed is an apparatus for producing a plasma-activated liquid comprising a first plasma source configured to generate a plasma in a first working gas supplied to the first plasma source, so that a first reactive gas stream is provided, a further plasma source configured to generate a plasma in a further working gas supplied to the further plasma source, so that a further reactive gas stream is provided, an activation chamber for receiving a liquid, and an impinging apparatus configured to impinge a liquid present in the activation chamber with the first reactive gas stream and with the second reactive gas stream.

According to the invention, the above task is also solved by using the apparatus described above or an embodiment thereof for producing a plasma-activated liquid, in particular according to the method described above or an embodiment thereof.

Uncontrolled reactions in the working gas or in the reactive gas stream can be avoided by the describe method, apparatus and use. For example, the generation of nitrogen oxides can at least be reduced. For example, reactive gas streams, which are each carriers of $O_2$ or $N_2$ or have oxidising or reducing properties, can be treated separately from each other, so that they may only come into contact with each other and react with each other in a liquid to which these gas streams are applied.

In addition, desired reactions in the working gas can be set by using working gases whose composition is known and adjusted before they are introduced to the individual plasma sources, in order to give the reactive gas stream corresponding properties. Also, suitable plasma sources or plasma parameters can be selected for the individual working gases in the method.

In particular, this allows the individual gas flows to be tempered separately, for example by adjusting the respective plasma sources used accordingly. This represents a particular advantage, as the temperature is known to influence the reaction rate of chemical reactions, as is the case here in particular in the hot plasma.

A plasma-activated liquid can be understood as a liquid that has been activated by the action of a reactive gas stream emerging from an atmospheric plasma source. In particular, the liquid can be directly exposed to atmospheric plasma, such as an atmospheric plasma jet, i.e. a working gas emerging from a plasma source that is at least partially still in the plasma state. Alternatively, the liquid can also be exposed to the working gas emerging from the plasma source after the working gas has already been recombined, i.e. is no longer in the plasma state. It has been found that such a recombined working gas still contains sufficient reactive species, for example ozone or nitrogen oxides, which form relatively long-lived reactive species in water, such as hydroxyl radicals, hydrogen peroxide, nitric acid or nitrous acid.

Accordingly, the plasma-activated liquid can be produced by exposing a liquid to a working gas escaping from an atmospheric plasma source.

The apparatus can have more than two plasma sources, each of which generates a plasma in a working gas, so that a reactive gas stream is provided, wherein the compositions of the respective working gases differ from one another.

The apparatus has an activation chamber for holding a volume of liquid and a plasma source for generating a reactive gas stream by means of electrical discharge in a working gas, the plasma source being connected to the activation chamber in such a way that a reactive gas stream generated by the plasma source is introduced into the activation chamber. In this way, an initial liquid, for example liquid water or an aqueous solution in the activation chamber, can be impinged with a reactive gas stream so that reactive species accumulate in it and a plasma-activated liquid is produced in this way.

Various embodiments of the method, the apparatus and the use are described below, each of which applies individually to the method, the apparatus and the use. In addition, the individual embodiments can be combined with one another.

In one embodiment, the plasma-activated liquid is produced by impinging an initial liquid with the first reactive gas stream and with the further reactive gas stream. In this way, reactions of several reactive gas streams generated by means of separate plasma sources with each other can be caused in a predictable and controllable manner in the impinged liquid. Accordingly, a plasma-activated liquid with specific properties can be provided.

The starting liquid can be water, an aqueous solution, a solvent, an alcohol-containing solution or similar.

In one embodiment, the starting liquid is impinged separately with the first reactive gas stream and with the other reactive gas stream. This ensures that the individual reactive gas streams do not react with each other before being introduced into the starting liquid. It can also be achieved that a reaction of components of the individual reactive gas streams only takes place in the impinged liquid.

In a corresponding embodiment, the impinging apparatus is configured to impinge the liquid present in the activation chamber separately with the first and with the further reactive gas stream.

Preferably, the first reactive gas stream and the further reactive gas stream are at least partially introduced into the starting liquid at the same time and at different spatial positions, so that a spatially separate impingement of the same starting liquid takes place. Alternatively or additionally, the first reactive gas stream and the further reactive gas stream can be introduced into the starting liquid with a time delay so that the starting liquid is impinged separately in terms of time.

For separate impingement of the starting liquid with the first and with the further reactive gas flow, it can be provided that the impinging apparatus has a first impinging element which is configured to impinge the liquid present in the activation chamber with the first reactive gas flow and that the impinging apparatus has a further impinging element which is configured to impinge the liquid present in the activation chamber with the further reactive gas flow. In this way, separate impingement of the starting liquid can be easily designed and suitable impingement parameters such as flow rate or speed and time synchronisation can be set.

In a further embodiment, the first reactive gas stream and the further reactive gas stream are first mixed to form a common reactive gas stream and then the starting liquid is impinged with the common reactive gas stream. In this way, a reaction of components of the individual reactive gas streams can be brought about in a targeted manner before introduction into the starting liquid.

In a further embodiment, a gas mixing apparatus is connected upstream of the impinging apparatus, the mixing apparatus being configured to mix the first reactive gas stream with the further reactive gas stream in a common reactive gas stream, and the impinging apparatus is configured to impinge the liquid present in the activation chamber with the common reactive gas stream. The gas mixing apparatus can be used to set the mixing conditions of the reactive gas streams, for example the mixing ratios, the mixing speed or similar. This allows the reactions of the individual components of the first reactive gas stream and the other reactive gas stream to be controlled.

Preferably, the gas mixing apparatus is conveniently arranged in the gas flow between the first plasma source and the impinging apparatus or between the further plasma source and the impinging apparatus.

In a further embodiment, the impinging apparatus is configured to mix the first and the further reactive gas stream and to impinge the starting liquid with the mixed reactive gas streams. In this way, a separate gas mixing apparatus can be dispensed with and the apparatus as a whole can be designed to be compact.

In a further embodiment, the impinging apparatus has an impinging element that is configured to impinge the starting liquid present in the activation chamber with a mixture of the first reactive gas stream and the second reactive gas stream. If necessary, the impinging apparatus can have a modular design, thus simplifying its maintenance and the replacement of individual impinging elements.

In a further embodiment, the first and the further reactive gas stream are brought into contact with a starting liquid separately or as a common reactive gas stream by means of an impinging apparatus, wherein the impinging apparatus comprises a disc aerator, an aeration element made of porous material.

In a corresponding embodiment, the aeration apparatus has a disc aerator, an aeration element made of porous material.

A disc aerator typically has a gas-permeable membrane, for example a membrane with a large number, in particular hundreds or thousands, of small openings through which the reactive gas flow enters the liquid in the form of small bubbles with a correspondingly large surface area in relation to the volume and thus interacts strongly with the liquid. A similarly strong interaction is achieved by using an aeration element made of porous material, for example porous ceramic with a large inner surface area.

A suitable manufacturing unit with a disc aerator is known, for example, from EP 3 470 364 A1.

The plasma-activated liquid is prepared by impinging a first starting liquid with the first reactive gas stream to provide a first impinged liquid, impinging a second starting liquid with the second reactive gas stream to provide a further impinged liquid, and obtaining the plasma-activated liquid by mixing the first impinged liquid with the further impinged liquid. In this way, a plasma-activated liquid can be provided whose properties are based on the composition of several impinged liquids.

The first starting liquid and the other starting liquid can be of the same type, for example water.

This also offers the advantage that the plasma-activated liquid can be made available with a time and/or spatial delay relative to the generation of the reactive gas streams. For this purpose, for example, the first and the further impinged liquid can be stored separately from each other for a certain period of time before they are then mixed. For example, a first impinged liquid with oxidative properties and a further impinged liquid with reducing properties can be stored or transported separately before they are mixed at a place of use and react with each other in order to then provide a plasma-activated liquid with properties of the reacted component of the individual impinged liquids.

In a further embodiment, the first and/or the further working gas is a predetermined technical gas. In this way, the composition and then also the reactions of the working gases can be controlled. In addition, technical gases are easily accessible on the market, so that an apparatus or a method in the present embodiment can accordingly be easily modelled, at least with regard to the working gas supply.

In a particular embodiment, the first and/or the further working gas are the result of a gas separation upstream of the individual plasma sources, for example by means of a separation apparatus, which then supplies the individual plasma sources with corresponding working gas.

A technical gas is a gas that is produced and used on a technical scale. In particular, a technical gas has a high degree of purity specified by standards, which is achieved by gas treatment. Such a degree of purity can, for example, be a maximum proportion in the order of $10^{-6.0}$ or 1 ppm of foreign gases. Technical gases can be either gases from a single element or gas mixtures of these pure gases. Technical gases are typically not gases that have been extracted from natural deposits without further treatment.

In one embodiment, the first and/or further working gas comprises one or more of the species or gas mixtures of predetermined composition selected from the list: $O_2$, $N_2$, inert gas such as Ar, $CO_2$, $Cl_2$, forming gas, $N_2$ mixed with one or more inert gas(es), $H_2$ mixed with one or more inert gas(es).

In a further embodiment, the first reactive gas stream is generated in the first working gas by means of electrical discharge. Alternatively or additionally, the further reactive gas stream is generated by means of electrical discharge in the further working gas. The electrical discharge is a dielectrically impeded discharge, a high-frequency arc-like discharge, a direct current arc discharge or a discharge generated by means of a microwave jet nozzle.

In a corresponding embodiment, the first plasma source and/or the further plasma source is configured to generate a plasma by means of an electrical discharge in a working gas, wherein the electrical discharge is a dielectrically impeded discharge, a high-frequency arc-like discharge, a direct current arc discharge or a discharge generated by means of a microwave jet nozzle.

In this way, plasma sources that are already available on the market can be used.

By providing or using a plasma source which is configured to generate the reactive gas stream by means of an arc-like electrical discharge, in particular a high-frequency arc-like discharge, in a working gas, a high concentration of certain reactive species can be generated in the gas stream, in particular fully or partially ionised or excited atoms or molecules.

To generate a reactive gas flow by means of a high-frequency arc-like discharge in a working gas, a plasma source with an electrically conductive nozzle tube having a downstream nozzle opening from which the reactive gas flow emerges during operation is preferably used, and with a working gas inlet on the upstream side, which is connected to the nozzle opening via a flow channel, wherein an internal electrode is arranged in the flow channel and wherein a high-frequency high voltage can be applied between the internal electrode and the nozzle tube.

For the operation of this arc-type plasma source, a working gas is introduced into the working gas inlet and a high-frequency high voltage is applied between the inner electrode and the nozzle tube, so that an arc-like discharge is formed between the inner electrode and the nozzle tube, with which the working gas flow interacts, whereby the working gas is at least partially converted into the plasma state, so that a reactive gas flow in the form of an atmospheric plasma jet emerges from the nozzle opening of the plasma nozzle. Preferably, a high-frequency high voltage with a voltage strength in the range of 1-100 kV, preferably 1-50 kV, more preferably 10-50 kV, and a frequency of 1-300 kHz, in particular 1-100 kHz, preferably 10-100 kHz, more preferably 10-50 kHz, is applied between the inner electrode and the nozzle tube.

Alternatively or additionally, a plasma source can be provided or used which is configured to generate the reactive gas flow by means of a dielectrically impeded discharge in a working gas. Very high concentrations of certain reactive species, in particular ozone, can be generated in the gas stream by means of a dielectrically impeded discharge. By using such a reactive gas stream to produce a plasma-activated liquid, hydroxyl radicals can be formed in the liquid, which have a good disinfecting effect.

To generate a reactive gas flow by means of a dielectrically impeded discharge in a working gas, a plasma source with an electrically conductive nozzle tube, which has a downstream nozzle opening from which the reactive gas flow emerges during operation, with an upstream working gas inlet, which is connected to the nozzle opening via a flow channel, is preferably used. The flow channel preferably extends at least in sections between the nozzle tube and a DBD electrode, whereby a dielectric is arranged between the nozzle tube and the DBD electrode and a high-frequency high voltage can be applied between the DBD electrode and the nozzle tube.

To operate this DBD plasma source, a working gas is introduced into the working gas inlet and a high-frequency high voltage is applied between the DBD electrode and the nozzle tube. Since the dielectric impedes direct discharges between the DBD electrode and the nozzle tube, dielectrically impeded discharges occur in the section of the flow channel extending between the DBD electrode and the nozzle tube, as a result of which the working gas flow channelled through the flow channel is excited and/or enriched with reactive species, so that a reactive gas flow emerges from the nozzle orifice. Preferably, a high-frequency high voltage with a voltage in the range of 5 to 15 kV and a frequency in the range of 7.5 to 25 kHz, in particular 13 to 14 kHz, is applied between the DBD electrode and the nozzle tube.

A DC arc discharge can be generated using a plasma spray nozzle, for example. In this case, a discharge is not pulsed, but is applied over a predetermined time window and the temperatures in the working gas or in the immediate vicinity of the discharge are usually several thousand Kelvin.

In a further embodiment, a first working gas source is provided and is configured to supply a first working gas to the first plasma source, and a further working gas source is provided and is configured to supply a further working gas to the further plasma source, wherein the composition of the first working gas differs from the composition of the further working gas.

This means that not only the parameters of the plasma source itself can be set individually for each working gas, but also the composition and, accordingly, the properties of the respective working gases themselves. For example, a first working gas and another working gas, which would react with each other if mixed in advance, can be treated separately with plasma according to their respective intrinsic properties.

Preferably, the first plasma source is connected to a first working gas source and the further plasma source is connected to a further working gas source, whereby the first and further working gas sources are separated from each other. In this way, the composition of the first and further working gas can be easily controlled.

In a further embodiment, the apparatus has a control apparatus which is configured to control the operation of the apparatus. In particular, the control apparatus can have a memory with commands, the execution of which on at least one microprocessor of the control apparatus causes the apparatus to be controlled.

BRIEF DESCRIPTION OF THE DRAWINGS

Further features and advantages of the method, the apparatus and the use are shown in the following description of embodiments, with reference being made to the attached drawing.

In the drawing.

DESCRIPTION OF THE INVENTION

Figure 1:
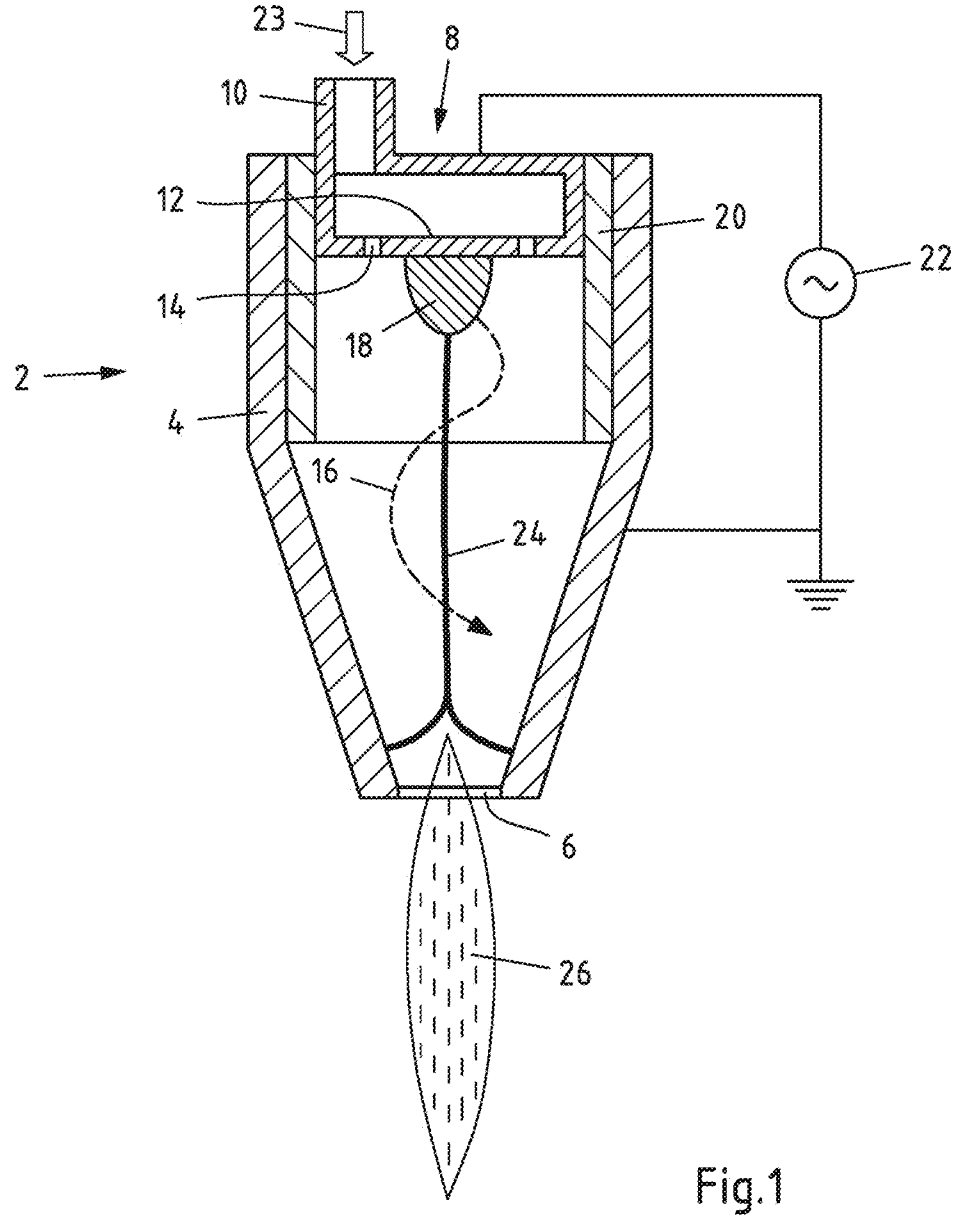
FIG. 1 shows a plasma source in the form of a plasma nozzle for generating an atmospheric plasma jet by means of an arc-like discharge.

FIG. 1 shows a schematic sectional view of a plasma source 2 in the form of a plasma nozzle for generating a reactive gas stream 26 in the form of an atmospheric plasma jet by means of an arc-like discharge, The plasma nozzle 2 has a metal nozzle tube 4 that tapers conically to a nozzle opening 6. At the end opposite the nozzle opening 6, the nozzle tube 4 has a swirl apparatus 8 with an inlet 10 for a gas flow, in particular a working gas, for example air or nitrogen.

An intermediate wall 12 of the swirl apparatus 8 has a ring of holes 14 set at an angle in the circumferential direction, through which the gas flow is swirled. The downstream, conically tapered part of the nozzle tube is therefore flowed through by the gas flow in the form of a vortex 16, the core of which runs along the longitudinal axis of the nozzle tube. An inner electrode 18 is arranged in the centre of the underside of the intermediate wall 12 and projects coaxially into the nozzle tube in the direction of the tapered section. The electrode 18 is electrically connected to the intermediate wall 12 and the other parts of the swirl Apparatus 8. The swirl apparatus 8 is electrically insulated from the nozzle tube 4 by a ceramic or quartz glass tube 20. A high-frequency high voltage, which is generated by a transformer 22, is applied to the electrode 18 via the swirl apparatus 8. The inlet 10 is supplied with a gas flow 23 via a line not shown. The nozzle tube 4 is earthed. The applied voltage generates a high-frequency discharge in the form of an arc 24 between the electrode 18 and the nozzle tube 4.

The terms "arc", "arc discharge" or "arc-like discharge" are used here as a phenomenological description of the discharge, as the discharge occurs in the form of an arc. The term "arc" is also used elsewhere as a form of discharge for DC discharges with essentially constant voltage values. In the present case, however, we are dealing with a high-frequency discharge in the form of an arc, i.e. a high-frequency, arc-like discharge.

However, due to the swirling flow of the working gas, this arc is channelled in the vortex core on the axis of the nozzle tube 4, so that it only branches out towards the wall of the nozzle tube 4 in the area of the nozzle opening 6. The working gas, which rotates at high flow velocity in the area of the vortex core and thus in the immediate vicinity of the arc 24, comes into intimate contact with the arc and is thus partially converted into the plasma state, so that an atmospheric plasma jet 26 emerges from the plasma nozzle 2 through the nozzle opening 6.

Figure 2:
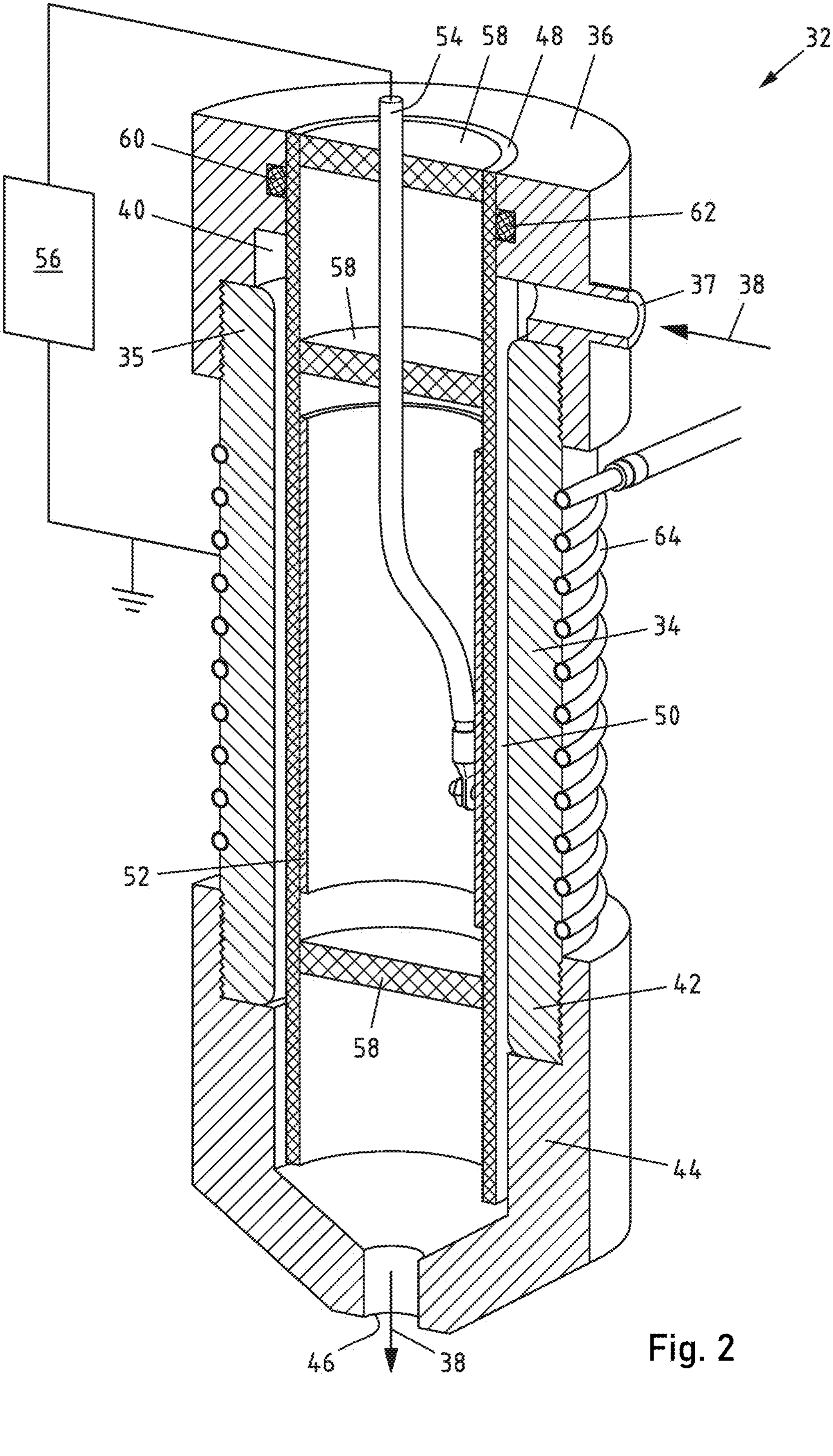
FIG. 2 shows plasma source in the form of a nozzle for generating a reactive gas flow by means of a dielectrically impeded discharge.

FIG. 2 shows a perspective schematic sectional view of a further plasma source 32 in the form of a nozzle for generating a reactive gas flow by means of dielectrically impeded discharge.

The nozzle 32 has a metal nozzle tube 34, at the upstream end 35 of which is arranged a distributor head 36 with an inlet 37 for a gas flow 38, for example air, and with an annular distributor channel 40. An outlet nozzle 44 with a nozzle opening 46 is arranged at the opposite downstream end 42 of the nozzle tube 34, from which the reactive gas stream 38 enriched with reactive species emerges during operation.

A ceramic tube 48 extends from the distributor head 36 through the nozzle tube 34 into the outlet nozzle 44 in such a way that an annular discharge channel 50 extends from the distributor channel 40 between the nozzle tube 34 and the ceramic tube 48 to the outlet nozzle 44. Instead of a ceramic tube, for example, a tube made of quartz glass can also be considered.

A tubular high-voltage electrode 52 made of metal is arranged on the inside of the ceramic tube 48, which is connected via a high-voltage cable 54 to a transformer 56, with which a high-frequency high voltage can be applied between the high-voltage electrode 52 and the earthed nozzle tube 34 acting as a counter-electrode. Instead of a tubular high-voltage electrode 52, a differently shaped high-voltage electrode can also be considered, for example in the form of a rounded metal sheet.

Insulating plugs 58 are arranged in the ceramic tube 48, which enclose the high-voltage electrode 52 and further prevent working gas from flowing into the area of the high-voltage electrode 52 or from flowing out of the nozzle 32 through the ceramic tube 48. Furthermore, a sealing ring 60 is inserted into an annular groove 62 on the distributor head 36, which seals the distributor head 36 to the ceramic tube 48.

A coolant line 64 can be provided around the nozzle tube 34, through which a coolant can be fed to cool the nozzle tube 34 during operation. The coolant line 64 can, for example, run in a spiral around the nozzle tube 34 as shown.

During operation, a gas flow 38 is introduced into the distributor head 36 through the inlet 37 so that the gas flow 38 flows through the annular discharge channel 50.

The transformer 56 is used to apply a high-frequency high voltage between the high-voltage electrode 52 and the nozzle tube 34, so that dielectrically impeded discharges occur in the discharge channel 50 in the area of the high-voltage electrode 52, which generate reactive species, in particular ozone, in the gas stream 38 flowing there.

The reactive gas stream 38 enriched with the reactive species exits the nozzle opening 46.

Figure 3:
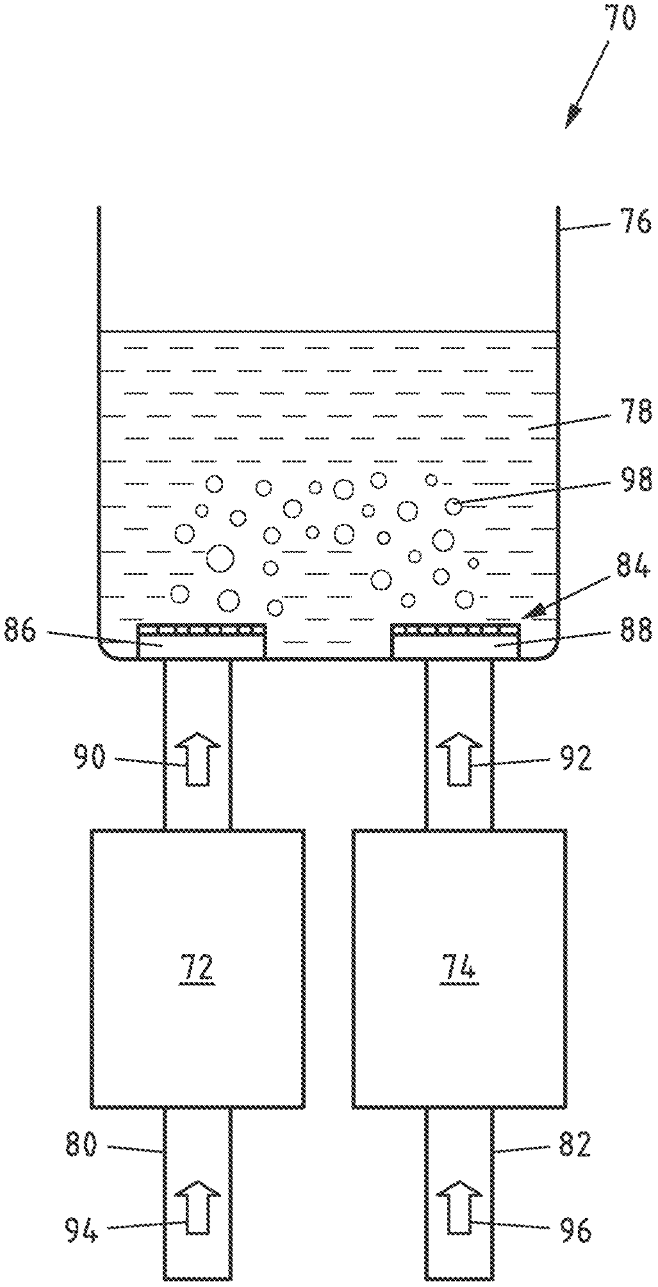
FIG. 3 shows a schematic view of a first embodiment of an apparatus for producing a plasma-activated liquid.

FIG. 3 shows a first embodiment of an apparatus 70 for plasma activation of a liquid. The apparatus 70 has a first plasma source 72, a second plasma source 74 and an activation chamber 76 for receiving a liquid 78, in this case water.

The first plasma source 72 is designed as a nozzle for generating a reactive gas stream by means of a dielectrically impeded discharge. The second plasma source 74 is designed as a plasma nozzle for generating a reactive gas stream in the form of an atmospheric plasma jet by means of an arc-like discharge. The first and the further plasma source 72, 74 each have a gas inlet 80, 82 which is configured to supply a working gas 94, 96 to the corresponding plasma source 72, 74.

The activation chamber 76 has an impinging apparatus 84 with a first impinging element 86 and with a second impinging element 88, both designed as disc diffusers. The first impinging element 86 is fluidically connected to the first plasma source 72, so that a first reactive gas stream 90 emerging from the first plasma source 72 can enter the activation chamber 76 via the first impinging element 86. Similarly, the second impinging element 88 is fluidically connected to the second plasma source 74, so that a second reactive gas stream 92 emerging from the second plasma source 74 can enter the activation chamber 76 via the second impinging element 88. The first and second impinging elements 86, 88 are designed and arranged separately from one another in such a way that the first reactive gas flow 90 and the second reactive gas flow 92 first meet in the activation chamber 76.

The apparatus shown schematically in FIG. 3 is operated as follows. The first plasma source 72 is supplied with a first working gas stream 94 via the first gas inlet 80 and the second plasma source 74 is supplied with a second working gas stream 96 via the second gas inlet 82. This supply takes place in a continuous flow and in parallel from separate—not shown here—working gas sources, wherein the first working gas 94 is a nitrogen-containing technical gas and the second working gas 96 is an oxygen-containing technical gas.

The first plasma source 72 generates a dielectrically impeded discharge in the nitrogen-containing, first working gas 94. As a result, the first working gas 94 becomes a first reactive gas stream 90, which is guided in flow from the first plasma source 72 to the first impinging element 86. There, the first reactive gas stream 90 is introduced through the porous structure of the first impinging element 86, which is designed as a disc aerator, into the water 78 absorbed by the activation chamber 76 as fine gas bubbles 98.

Parallel to this, the second plasma source 74 generates an arc-like discharge in the oxygen-containing, second working gas 96, which is then converted into a corresponding reactive gas stream 92 and fed to the second impinging element 88. There, the second reactive gas stream 92 is introduced into the water 78 of the activation chamber 76 separately from the first reactive gas stream 90 emerging from the first plasma source 72.

In the activation chamber 76, the first and second reactive gas streams 90, 92 react with the water 78 and with each other to produce plasma-activated water.

Figure 4:
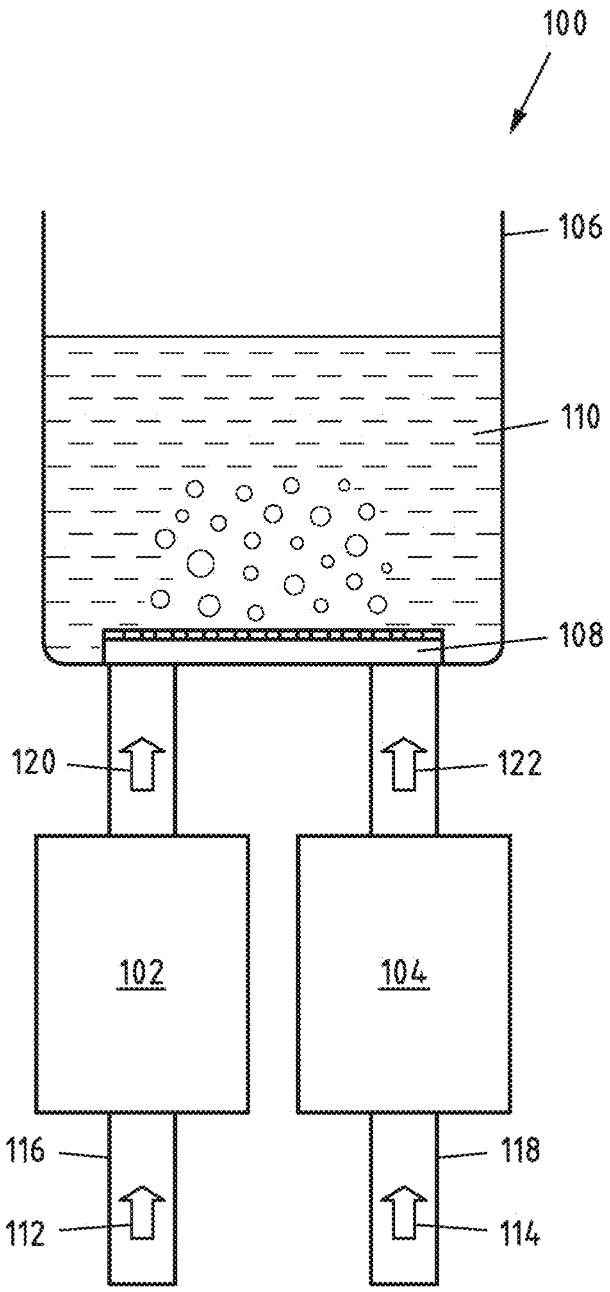
FIG. 4 shows a schematic view of a second embodiment of an apparatus for producing a plasma-activated liquid.

FIG. 4 shows a schematic view of a second embodiment of an apparatus 100 for producing a plasma-activated liquid. As in FIG. 3, this Apparatus 100 has a first plasma source 102, a second plasma source 104 and an activation chamber 106 for holding a liquid 108—in this case an alcohol-containing solvent—with an impinging apparatus 110. In the embodiment of FIG. 4, however, the apparatus is designed such that the impinging apparatus 110 is a unitary aeration element made of a porous material, which is fluidically connected to both the first and the second plasma source 102, 104. Furthermore, the first and second plasma sources 102, 104 are both configured to generate a reactive gas stream by means of an arc-like discharge in a working gas.

In operation, a first working gas 112 is supplied to the first plasma source 102 and a second working gas 114 is supplied to the second plasma source 104 via the respective gas inlets 116, 118. The first plasma source 102 generates a first reactive gas stream 120, while the second plasma source 104 generates a second reactive gas stream 122. The first and second reactive gas streams 120, 122 are then fed in parallel and simultaneously to the impinging apparatus 108, where they are introduced into the alcohol-containing solvent 110 of the activation chamber 106.

Figure 5:
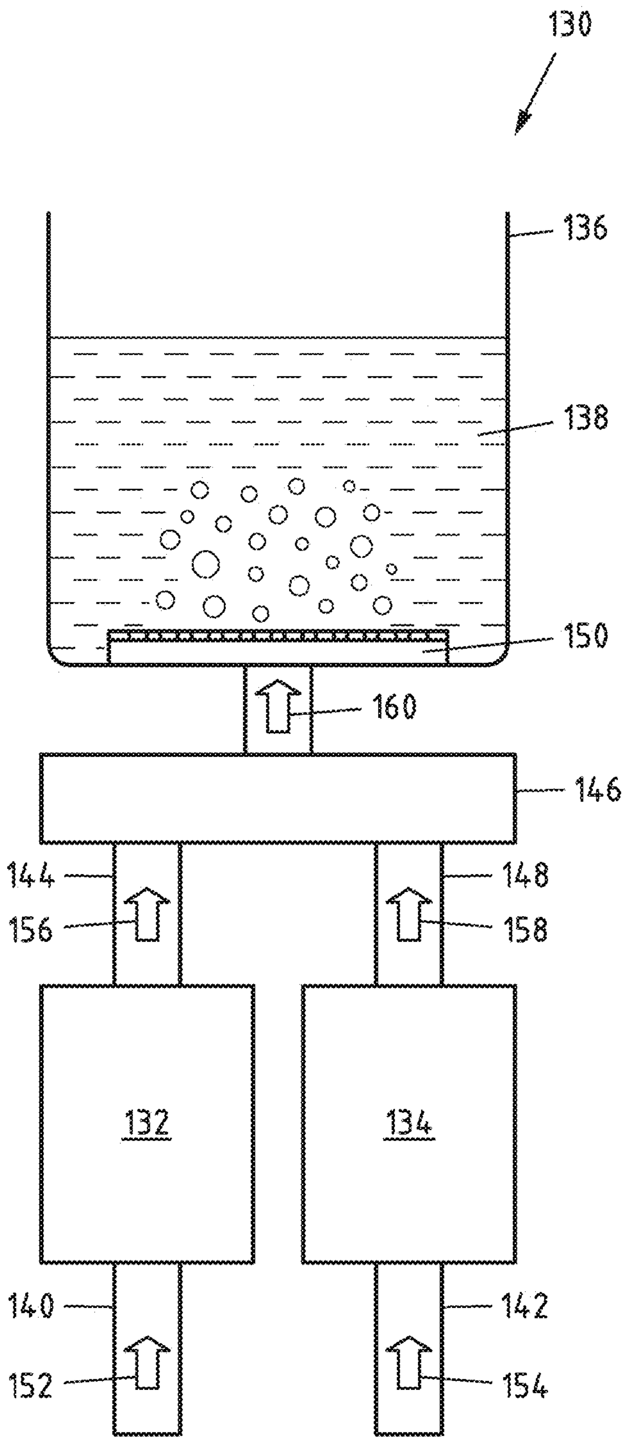
FIG. 5 shows a schematic view of a third embodiment of an apparatus for producing a plasma-activated liquid.

FIG. 5 shows a schematic view of a third embodiment of an apparatus 130 for producing a plasma-activated liquid. Also shown here are a first plasma source 132, a second plasma source 134 and an activation chamber 136 with a liquid 138. The first plasma source 132 and the second plasma source 134 are both designed to generate a reactive gas stream by means of a dielectrically impeded discharge in a working gas and each have a gas inlet 140, 142, whereby these are separated from one another. In addition, the first plasma source 102 has a first gas outlet 144, which is fluidically connected to a gas mixing apparatus 146. Similarly, a second gas outlet 148 fluidically connected to the gas mixing apparatus 146 is provided on the second plasma source 134.

The gas mixing apparatus 146 is, in turn, fluidically connected to an impinging apparatus 150 of the activation chamber 136. Thus, the gas mixing apparatus 146 is located upstream of the impinging apparatus 150 in the gas flow. The impinging apparatus 150 is designed as a disc aerator.

For plasma activation of the liquid 138 received in the activation chamber, the first and second plasma sources 132, 134 are each supplied with a working gas 152, 154, wherein the compositions of the respective working gases 152, 154 are different. The first and second plasma sources 132, 134 generate a plasma in parallel in the first and second working gases 152, 154, respectively, and thus also a first reactive gas stream 156 and a second reactive gas stream 158, which are each supplied to the gas mixing apparatus 146.

In the gas mixing apparatus 146, the first reactive gas stream 156 and the second reactive gas stream 158 are mixed together and then fed to the impinging apparatus 150 as a common reactive gas stream 160. There, the common reactive gas stream 160 is brought into contact with the liquid 138 in the activation chamber 136 and mixed with it in order to provide a plasma-activated liquid. In this Method, therefore, the first reactive gas stream 156 and the further reactive gas stream 158 are first mixed to form a common reactive gas stream 160, and then an initial liquid is impinged with the common reactive gas stream 160.

Figure 6:
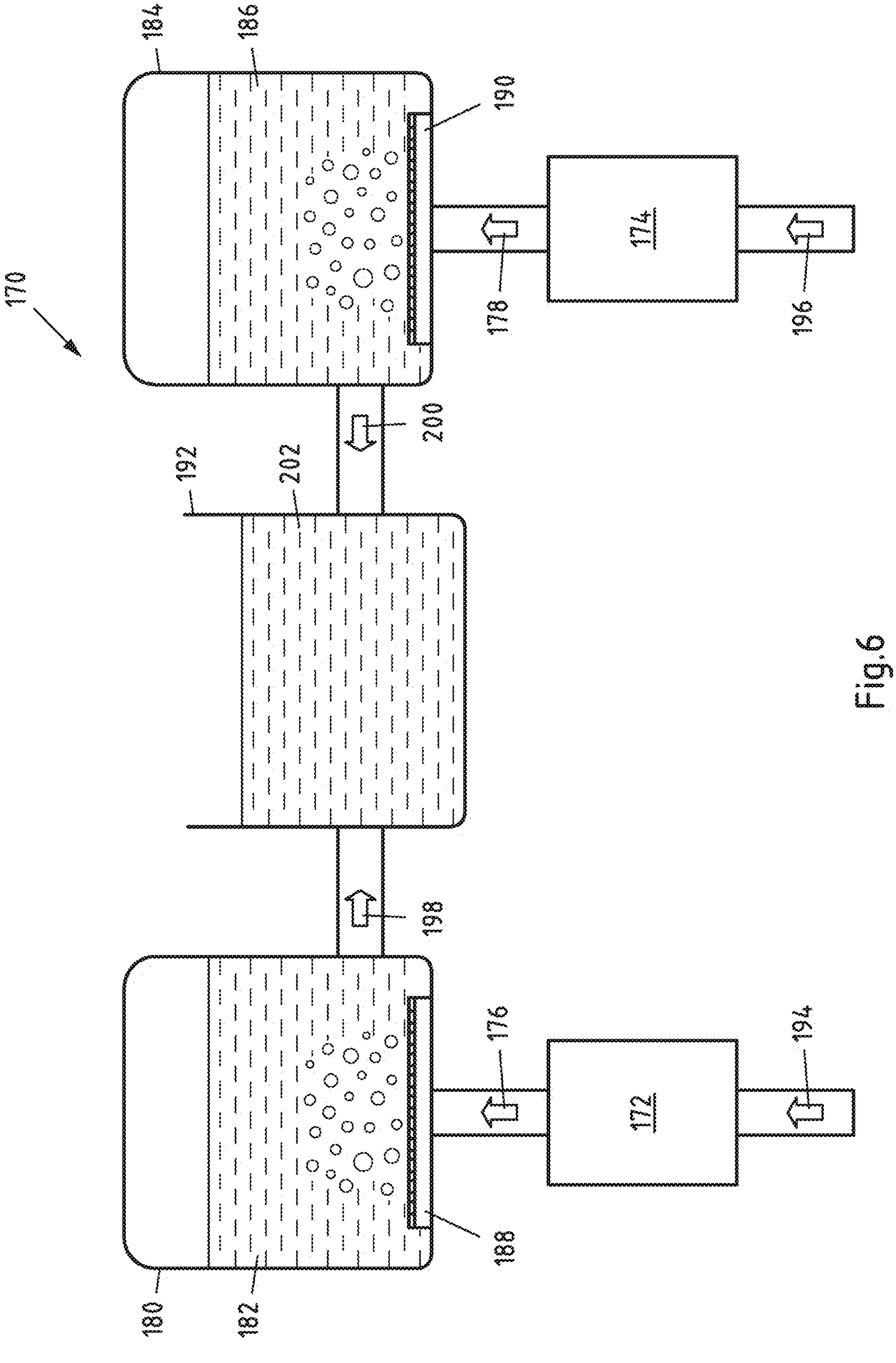
FIG. 6 shows a schematic view of a fourth embodiment of an apparatus for producing a plasma-activated liquid.

FIG. 6 shows a schematic view of a fourth embodiment of an apparatus 170 for producing a plasma-activated liquid. A first plasma source 172 and a second plasma source 174 are provided, both being configured to generate a reactive gas stream 176, 178 by means of an arc-like discharge in a working gas. Furthermore, a first activation chamber 180 with a first liquid 182 and a second activation chamber 184 with a second liquid 186 are provided, each activation chamber 180, 182 having an impinging apparatus 188, 190.

The first plasma source 172 is fluidically connected to the first activation chamber 180 or to the impinging apparatus 188 of the first activation chamber 180. In addition, the second plasma source 174 is fluidically connected to the second activation chamber 184 or to the impinging apparatus 190 of the second activation chamber 184.

The apparatus 170 further comprises a mixing container 192 which is fluidically connected to the first activation chamber 180 and to the second activation chamber 184.

To provide a plasma applied fluid, the first plasma source 172 is supplied with a first working gas 194 and the second plasma source 174 is supplied with a second working gas 196 in parallel. The first plasma source 172 generates a plasma in the first working gas 194 and the resulting first reactive gas stream 176 flows from the first plasma source 172 to the impinging apparatus 188 and is thus mixed with the liquid 182 in the first activation chamber 180. In addition and simultaneously, the second plasma source 174 generates a second reactive gas stream 178 by discharge in the second working gas 196, wherein the second reactive gas stream 178 is fed to the impinging apparatus 190 of the second activation chamber 184 and supplied to the liquid 186 present in the second activation chamber 184.

Thus, in parallel, a first liquid 198 impinged with the first reactive gas stream is provided in the first activation chamber 180 and a second liquid 200 impinged with the second reactive gas stream is provided in the second activation chamber 183. In a further method step, the first impinged liquid 198 and the second impinged liquid 200 are fed to the mixing container 192 and mixed therein to form a plasma-activated liquid 202.

It is also conceivable to provide three liquids 182, 186 and 202 each in a container, to impinge only two of them with a reactive gas stream, and then to mix these impinged two liquids with the third liquid.

The invention claimed is:

1. A method for producing a plasma-activated liquid, wherein a first working gas is supplied to a first plasma source and a plasma is generated in the first working gas by the first plasma source so that the first plasma source provides a first reactive gas stream, wherein a further working gas is supplied to a further plasma source and a plasma is generated in the further working gas with the further plasma source, so that the further plasma source provides a further reactive gas stream, and wherein a plasma-activated liquid is produced using the first and further reactive gas streams, wherein the composition of the first working gas differs from the composition of the further working gas, wherein the plasma-activated liquid is produced by impinging a first starting liquid with the first reactive gas stream to provide a first impinged liquid, impinging a second starting liquid with the second reactive gas stream to provide a further impinged liquid, and obtaining the plasma-activated liquid by mixing the first impinged liquid with the further impinged liquid.

2. The method according to claim 1, wherein the first working gas and/or the further working gas is a predetermined technical gas.

3. The method according to claim 1, wherein the first reactive gas stream is produced by means of electrical discharge in the first working gas, and/or wherein the further reactive gas stream is produced by means of electrical discharge in the further working gas, wherein the electrical discharge is a dielectrically impeded discharge, a high-frequency arc-like discharge, a DC arc discharge or a discharge generated by a microwave jet nozzle.

4. The method according to claim 1, wherein the first reactive gas stream and the further reactive gas stream are brought into contact with a starting liquid separately, wherein the impinging apparatus comprises a disc aerator, an aeration element made of porous material.

5. An apparatus for producing a plasma-activated liquid with a first plasma source and with a second plasma source, wherein a first activation chamber with a first liquid and a second activation chamber with a second liquid are provided, wherein each activation chamber comprises an impinging device, wherein the first plasma source is fluidically connected to the first activation chamber or to the impinging device of the first activation chamber, wherein the second plasma source is fluidically connected to the second activation chamber or to the impinging device of the second activation chamber, wherein the first plasma source and the second plasma source are configured to generate a reactive gas stream by means of an arc-like discharge in a working gas, wherein the device is designed in such a way that the first plasma source is supplied with a first working gas and the second plasma source is supplied with a second working gas in parallel, the first plasma source generates a plasma in the first working gas and the resulting first reactive gas stream flows from the first plasma source to the impinging device and is thus mixed with the liquid in the first activation chamber, and in parallel and simultaneously, the second plasma source generates a second reactive gas stream by discharge in the second working gas, the second reactive gas stream being fed to the second activation chamber of the impinging device and supplied to the liquid present in the second activation chamber, a first liquid impinged with the first reactive gas stream is provided in the first activation chamber and, in parallel, a second liquid impinged with the second reactive gas stream is provided in the second activation chamber, and the device has a mixing container which is fluidically connected to the first activation chamber and to the second activation chamber, so that the first impinged liquid and the second impinged liquid are fed to the mixing container and mixed therein to form a plasma-activated liquid.

6. The apparatus according to claim 5, wherein a first working gas source is provided and configured to supply a first working gas to the first plasma source, and a further working gas source is provided and is configured to supply a further working gas to the further plasma source, wherein the composition of the first working gas differs from the composition of the further working gas.

7. The apparatus according to claim 5, wherein the first plasma source and/or the further plasma source is configured to generate a plasma by means of electrical discharge in a working gas, wherein the electrical discharge is a dielectrically impeded discharge, a high-frequency arc-like discharge, a DC arc discharge or a discharge generated by a microwave jet nozzle.

8. The apparatus according to claim 5, wherein the aeration apparatus has a disc aerator or an aeration element made of porous material.

* * * * *